(12) United States Patent
Lettner et al.

(10) Patent No.: US 6,425,749 B1
(45) Date of Patent: Jul. 30, 2002

(54) COUPLING AND FUEL-SUPPLY PUMP WITH COUPLING

(75) Inventors: Thomas Lettner, Adnet (AT); Heiner Fees, Bietigheim-Bissingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/701,481

(22) PCT Filed: Mar. 11, 2000

(86) PCT No.: PCT/DE00/00773

§ 371 (c)(1),
(2), (4) Date: Mar. 16, 2001

(87) PCT Pub. No.: WO00/58640

PCT Pub. Date: Oct. 5, 2000

(30) Foreign Application Priority Data

Mar. 29, 1999 (DE) .......................... 199 14 269

(51) Int. Cl.[7] .............................. F04C 2/18; F04C 15/00; F16D 3/10
(52) U.S. Cl. .................... 418/182; 418/206.1; 403/188; 403/365; 464/150
(58) Field of Search .............................. 418/182, 206.1; 464/75, 89, 106, 150; 403/1, 188, 194, 345, 353, 354, 359.1, 365, 383

(56) References Cited

U.S. PATENT DOCUMENTS

| 813,018 | A | * | 2/1906 | Okun | 418/182 |
|---|---|---|---|---|---|
| 1,687,523 | A | * | 10/1928 | Staude | 418/206.1 |
| 3,037,455 | A | * | 6/1962 | Bozimowski et al. | 418/182 |
| 3,955,905 | A | * | 5/1976 | Frommholz et al. | 418/182 |
| 4,385,897 | A | * | 5/1983 | Mallet | 464/89 |
| 4,464,141 | A | * | 8/1984 | Brown | 464/150 |
| 6,050,795 | A |  | 4/2000 | Bodzak et al. | 418/206.1 |

* cited by examiner

Primary Examiner—John J. Vrablik
(74) Attorney, Agent, or Firm—Ronald E. Griegg

(57) ABSTRACT

The invention relates to a coupling for coupling two rotatable bodies, in particular a gear and a drive shaft, which are disposed essentially concentric to each other, with or without axial offset, having a coupling part. In order to reduce the structural height of the coupling, the coupling part is integrated into one of the rotatable bodies. In a fuel-supply pump, the drive shaft is coupled to the driven gear by means of the coupling part.

17 Claims, 3 Drawing Sheets

COUPLING AND FUEL-SUPPLY PUMP WITH COUPLING

CROSS-REFERENCE TO RELATED APPLICATIONS

This application is a 35 USC 371 application of PCT/DE 00/00773 filed on Mar. 11, 2000.

PRIOR ART

The invention relates to a coupling for coupling two rotatable bodies, in particular a gear and a drive shaft which are disposed essentially concentric to each other, with or without an axial offset, having a coupling part. The invention also relates to a fuel-supply pump with two rotatable gears that engage each other and are disposed in a pump chamber, which supply fuel from an intake chamber connected to a storage chamber, along a supply conduit constituted between the end faces of the gears and the circumference wall of the pump chamber, into a pressure chamber, wherein one of the gears is driven by a drive shaft.

The coupling of two rotatable bodies can take place, for example, by means of a cross notched coupling, which is also known as a cross-staff or Oldham coupling. Couplings based on the cross notch principle are used to transmit movements. They are predominantly used for drive coupling when axes are not in alignment.

The cross notch principle is based on two coupling halves (driving and driven) and an intermediary disk as a coupling part. Guide strips or guide grooves that are disposed perpendicular to each other are embodied on both coupling halves. Complementary guide grooves or guide strips are embodied on the intermediary disk. The transmission of the rotary movement occurs in an equiangular manner, wherein the intermediary disk slides against the guides of the coupling halves.

The known cross notch principle is based on a series connection of a driving element, an intermediary disk, and a driven element. The transmission of a torque occurs in two planes. This results in a relatively large structural height. In addition, the tilting inclination of the intermediary disk has turned out to be disadvantageous. The occurrence of a large surface pressure in the guides at high speeds leads to an intense development of frictional heat and a high degree of abrasion.

The object of the invention is to produce a coupling that functions according to the cross notch principle and a fuel-supply pump with a coupling of this kind that has a small structural height and a long service life. The coupling according to the invention and the fuel-supply pump according to the invention should be inexpensive to produce and easy to assemble.

In a coupling for coupling two rotatable bodies, in particular a gear and a drive shaft which are disposed essentially concentric to each other, with or without an axial offset, having a coupling part, the object is attained by virtue of the fact that the coupling part is integrated into one of the rotatable bodies. As a result, connecting shafts and captive retentions that are required in conventional couplings can be eliminated. This leads to a reduction in the number of required parts. In addition, a pre-centering of the rotatable bodies is possible with the aid of the integrated coupling part. The coupling part can be comprised of one or several parts.

A particular embodiment of the invention is characterized in that the coupling part is embodied as intrinsically asymmetrical. This has the advantage that it prevents an incorrect installation of the coupling part. This simplifies the assembly.

Another particular embodiment of the invention is characterized in that the contact surfaces between the coupling part and the rotatable bodies are embodied as convex. As a result, the surface pressure occurring during operation is reduced and the lubrication properties are improved. The attendant friction and therefore abrasion are minimized.

Another particular embodiment of the invention is characterized in that the coupling part has the form of a disk, which has a central oblong hole with approximately planar or slightly convex side surfaces let into it that serves to receive the one rotatable body, in particular a drive shaft, and which has four tapering projections embodied on it, wherein a central recess is provided in the other rotatable body, in particular a gear, whose contour is embodied as complementary to the contour of the disk. Usually, the coupling is disposed outside the function chamber. Through the embodiment of the coupling according to the invention, it is possible to dispose the coupling inside the function chamber. The function chamber can, for example, be the housing of a fuel-supply pump.

In a fuel-supply pump with two rotatable gears that engage each other and are disposed in a pump chamber, which supply fuel from an intake chamber connected to a storage chamber, along a supply conduit constituted between the end faces of the gears and the circumference wall of the pump chamber, into a pressure chamber, wherein one of the gears is driven by a drive shaft, the above-explained object is attained by virtue of the fact that the drive shaft is coupled to the driven gear by means of a coupling described at the beginning. A fuel-supply pump of this kind has been disclosed, for example, by DE 196 25 488, U.S. Pat. No. 6,050,795, the disclosure of which is hereby incorporated by reference. The fuel-supply pump is driven, for example, by means of the camshaft of an internal combustion engine. The fuel-supply pump can also be coupled to a high-pressure pump. The fuel-supply pump according to the invention has the following advantages: coupling of the gear to the drive shaft in only one plane, fewer points of intersection, a smaller tilting inclination, less intense tilting moments, lower friction, smaller structural height, fewer parts, optimized materials utilization, weight reduction, integration of the coupling part into the driven gear, no additional recess or guide required for the coupling part, integrated lubrication, integrated cooling, inexpensive and efficient manufacture using sintering technology, plastic injection molding technology, or punching technology, possible pre-centering during assembly, improved damping, prevention of incorrect installation of the coupling part by means of asymmetrical geometry, clockwise and counterclockwise travel with uniform transmission behavior, possible clockwise and counterclockwise travel with different transmission behaviors, reduced surface pressure due to convex or concave contact geometry, and elimination of captive retention through subassembly integration.

Other advantages, features, and details of the invention ensue from the following description in which various exemplary embodiments of the invention will be described in detail in conjunction with the drawings. The features mentioned in the claims and in the specification can be essential to the invention individually or in arbitrary combinations.

BRIEF DESCRIPTION OF THE DRAWINGS

In FIG. 1, an embodiment of a coupling according to the invention is labeled as a whole with the numeral 1. A gear 2 is coupled to a drive shaft 4 with the aid of a coupling part 3. As shown in FIG. 2, two flattenings 6 and 7 are embodied at the end 5 of the drive shaft 4. The end 5 of the drive shaft 4 is received in oblong hole 8, which has two approximately planar or slightly convex side surfaces 6' and 7' (FIG. 4) and is let into the coupling part 3.

Figure 1:
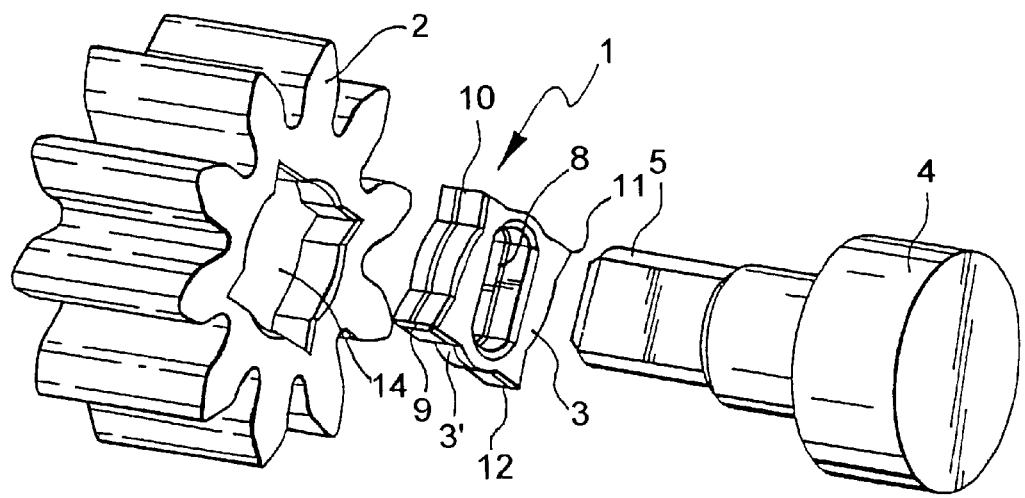
FIG. 1 shows an exploded view of a coupling according to the invention.
Figure 2:
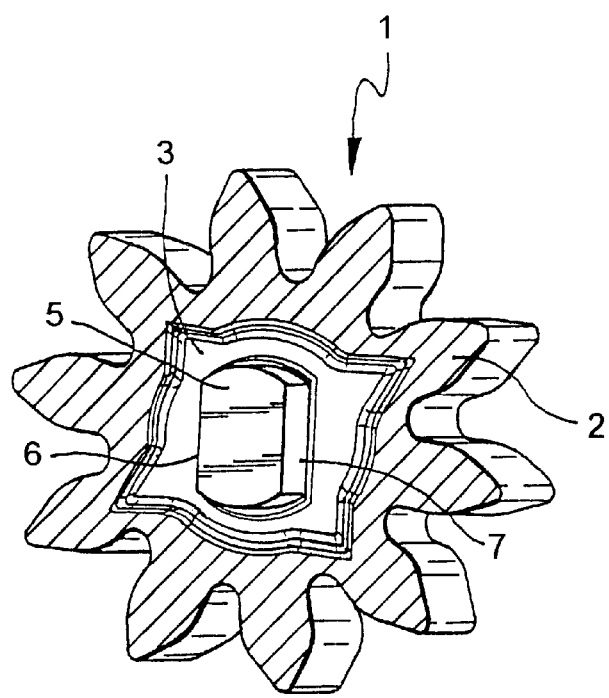
FIG. 2 shows the coupling from FIG. 1 when assembled.

The coupling part 3 essentially has the form of a block-shaped disk which has four tapering projections 9, 10, 11, and 12 embodied on it, arranged in a star shape. An inspection of FIG. 2 shows that each of the four projections 9, 10, 11, and 12 extend a different distance from the center of the coupling part 3, and thus the part is asymmetrical. Also, as can be seen in FIG. 1, the coupling part can be formed of two or more identically shaped disks 3 and 3'. As can be seen in the drawings, the surfaces between the projections 9 to 12 are each slightly convex.

A recess 14 is provided in the gear 2, whose geometry is embodied as complementary to the coupling part 3. A through opening for receiving the end 5 of the drive shaft 4 can be let into the center of the recess 14. There is sufficient play between the coupling part 3 and the recess 14 in the gear 2 in order to assure a simple assembly of the coupling 1. The special geometry of the coupling part 3 and the recess 14 in the gear 2 assures a reliable transmission of torque. At the same time, axial offsets can be compensated for.

Figure 3:
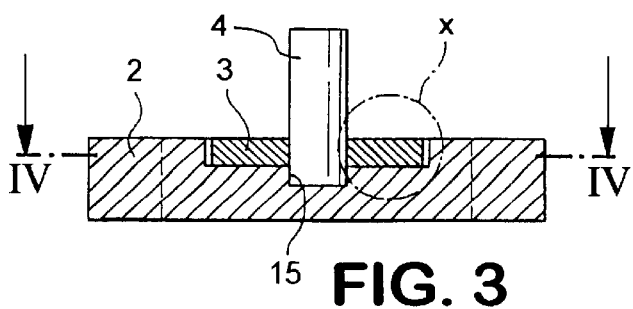
FIG. 3 shows a sectional view of the coupling shown in FIGS. 1 and 2.

The side view depicted in FIG. 3 shows that the gear 2 is not provided with a through opening, but rather with a blind hole 15 for receiving the end of the drive shaft 4.

Figure 4:
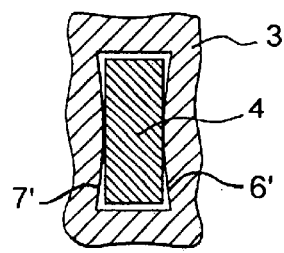
FIG. 4 is a partial sectional view along the line IV—IV in FIG. 3.

The side view depicted in FIG. 4 shows that the contact surfaces between the coupling part 3 and the drive shaft 4 are embodied as convex. As a result, the forces occurring during operation are uniformly distributed.

Figure 5:
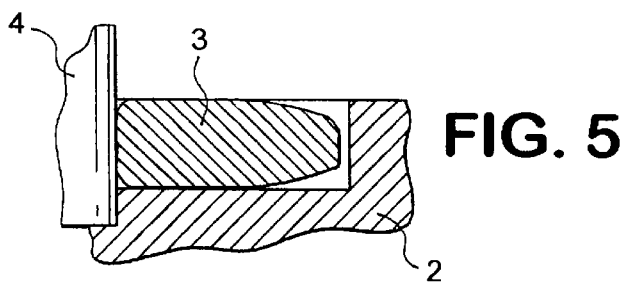
FIG. 5 is an enlarged view of the detail x in FIG. 3.

The side view of the detail x from FIG. 3 depicted in FIG. 5 shows that not only the contact surfaces between the coupling part 3 and the drive shaft 4, but also the contact surfaces between the coupling part 3 and the gear 2 are embodied as convex. As a result, in addition to the advantage of reduced surface pressure, this facilitates the entry of lubricant.

Figure 6:
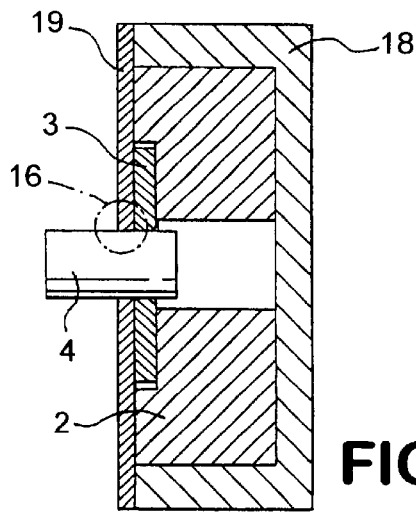
FIG. 6 is a sectional view of a first exemplary embodiment of a fuel-supply pump according to the invention.
Figure 7:
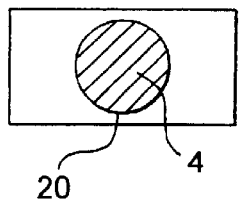
FIG. 7 shows a side view of a detail from FIG. 6.

In FIG. 6, the gear 2 is disposed in a housing 18 of a fuel-supply pump according to the invention. The design and function of the fuel-supply pump are taken from DE 196 25 488 U.S. Pat. No. 6,050,795. The housing 18 is closed by a cover 19 which is provided with a bore for the drive shaft 4. A circle 16 indicates where the drive shaft 4 is centered in relation to the cover 19. FIG. 7 shows that the entire circumference 20 of the drive shaft 4 is used for centering.

Figure 8:
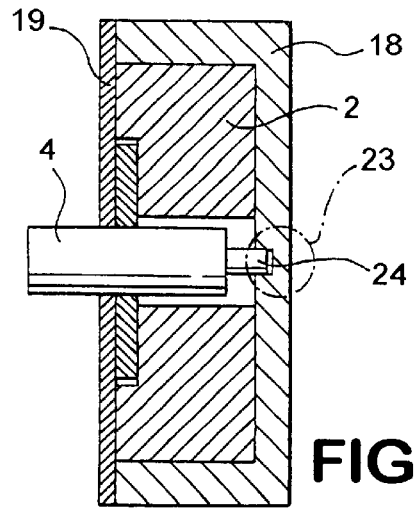
FIG. 8 is a sectional view of a second exemplary embodiment of a fuel-supply pump according to the invention.
Figure 9:
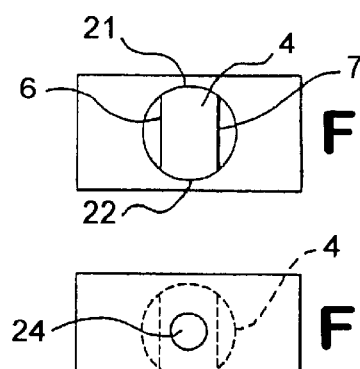
FIG. 9 shows a detail from FIG. 8.

FIGS. 8 and 9 schematically show that when the end of the drive shaft is embodied with flattenings 6 and 7, the remaining surfaces 21 and 22 are used for centering purposes.

Figure 10:
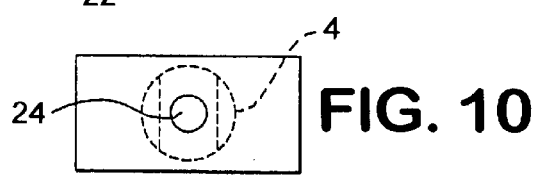
FIG. 10 shows another detail from FIG. 8.

It can be inferred from FIGS. 8 and 9 that a shaft stump 24 embodied at the end of the drive shaft 4 can also be used to center the drive shaft 4, as indicated by the circle 23 in FIG. 8. In FIG. 10, the contours of the drive shaft 4 are indicated by dashed lines.

Figure 11:
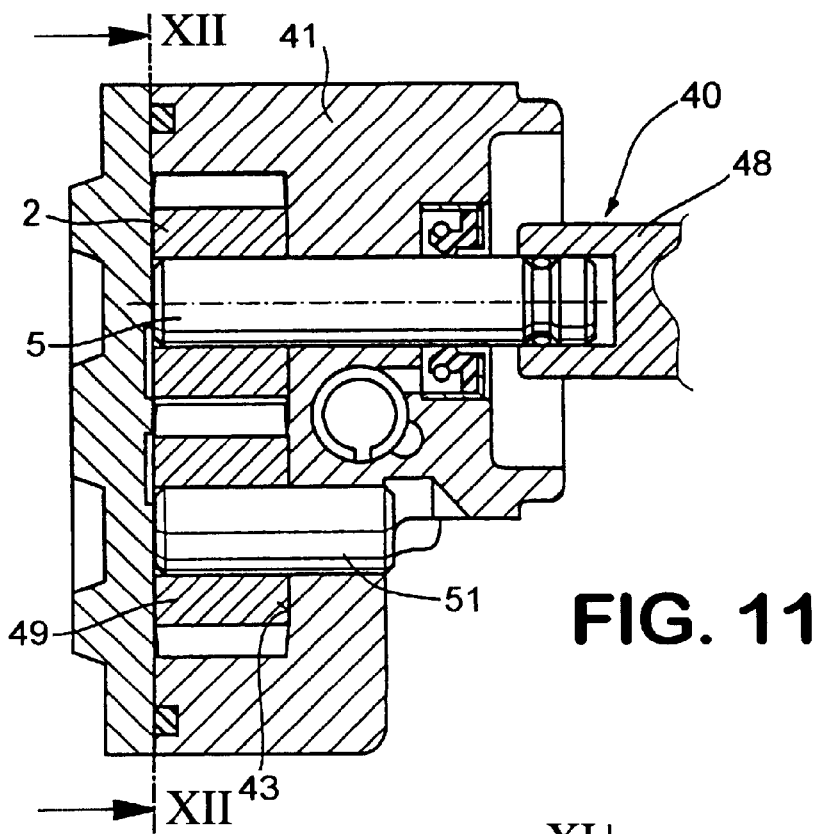
FIG. 11 is a longitudinal section through the fuel feed pump taken along the line XI—XI of FIG. 12.
Figure 12:
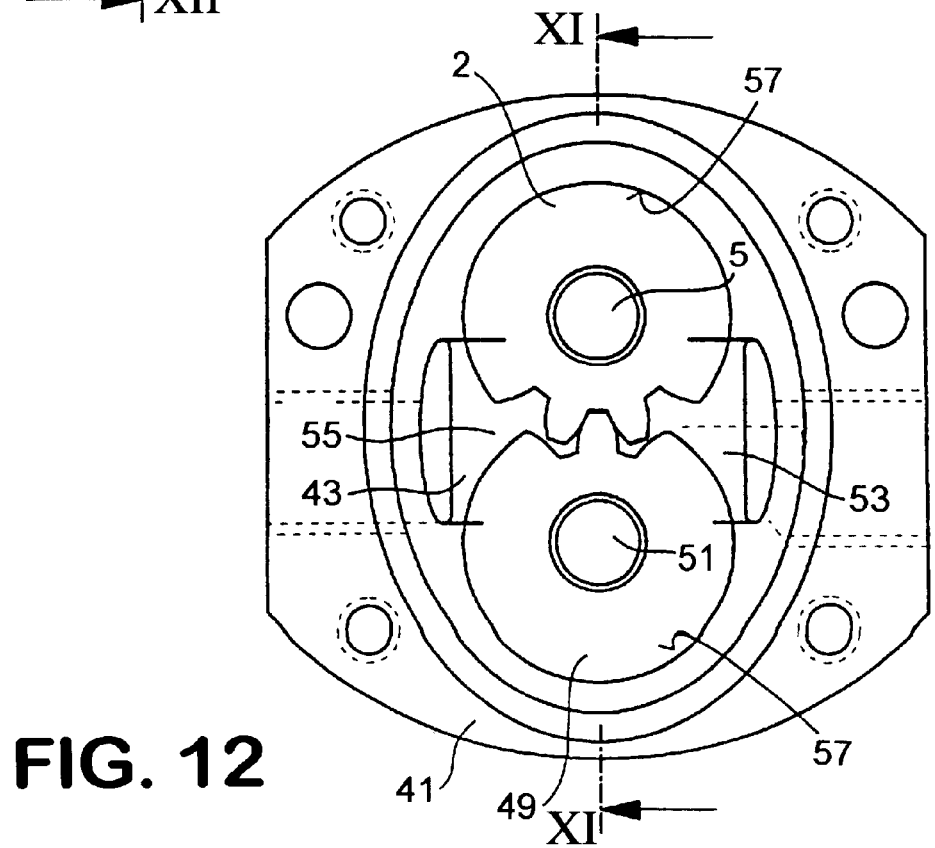
FIG. 12 is a plan view on the fuel feed pump shown in FIG. 11, with the housing cap removed.

FIGS. 11 and 12 show views of a fuel feed pump which can use the coupling of this invention. The feed pump is used in an inflow line, not shown, from a supply tank to a fuel injection pump for internal combustion engines. The feed pump in its housing 41 has a pump chamber 43, in which a rotationally driven pair of gear wheels that mesh with one another is disposed. A first gear wheel 2 driven by a shaft 5, which is driven to rotate by means of a drive element 48, via an overload safety device 40. Rotary motion is transmitted by means of spur gear 2 to a second gear wheel 49, which meshes with the first gear wheel 2 and is disposed on an axle 51 supported on the housing. The gear wheels 2, 49, by the engagement of their teeth which are only partially shown, divide the pump chamber 43 into two parts, of which a first part forms an intake chamber 53 and a second part forms a pressure chamber 55. The intake chamber 53 communicates with the pressure chamber 55 via feed conduits 57, each formed between the grooves between teeth on the end faces of the first gear wheel 2 and the second gear wheel 49 and the circumferential wall of the pump chamber 43. In addition, the intake chamber 53 and the pressure chamber 55 each have one connection opening in the wall of the pump housing 41, by way of which the intake chamber 53 communicates with an intake line, not shown in further detail, from the supply tank and the pressure chamber 55 communicates with a feed line, likewise not shown, to the suction chamber of the fuel injection pump.

Normally, the coupling is disposed outside the housing of the fuel-supply pump. This arrangement requires an additional connecting shaft. This produces additional points of intersection between the coupling and the connecting shaft and between the connecting shaft and the driven gear. A captive retention is also required for the coupling.

The embodiment according to the invention permits a complete integration of the entire coupling system into the housing of the fuel-supply pump. The supply medium contained in the housing of the fuel-supply pump is used to lubricate and cool the coupling according to the invention.

The foregoing relates to preferred exemplary embodiments of the invention, it being understood that other variants and embodiments thereof are possible within the spirit and scope of the invention, the latter being defined by the appended claims.

We claim:

1. A coupling for coupling rotatable bodies, the rotatable bodies being a gear (2) and a drive shaft (4) which are disposed essentially concentric to each other, the coupling having a coupling part (3), wherein the coupling part (3) is integrated into one of the rotatable bodies (2, 4), and wherein the coupling part (3) is asymmetrical.

2. The coupling according to claim 1, wherein the coupling part has surfaces which transmit torque between the coupling part (3) and the rotatable bodies (2, 4), and wherein the surfaces which transmit torque are convex.

3. A fuel-supply pump with two rotatable gears that engage each other and are disposed in a pump chamber (43), which supply fuel from an intake chamber (53) along a feed conduit (57) constituted between the end faces of the gears and the circumference wall of the pump chamber, into a pressure chamber (55), the improvement comprising: one of the gears (2) is a driven gear, and the driven gear is driven by the drive shaft (4), wherein the drive shaft (4) is coupled to the driven gear (2) by means of a coupling (1) according to claim 1.

4. The coupling according to claim 1, wherein the coupling part (3) is a disk which has a central oblong hole (8) receives the drive shaft (4), and which has four tapering projections (9, 10, 11, 12) embodied on it, wherein a central recess (14) is provided in the gear (2), whose contour is complementary to the contour of the disk.

5. The coupling according to claim 4, wherein the surfaces of the shaft that engage the hole are flat, and the side surfaces of the hole which engage with the surfaces of the shaft are slightly convex.

6. A fuel-supply pump with two rotatable gears that engage each other and are disposed in a pump chamber (43), which supply fuel from an intake chamber (53) along a feed conduit (57) constituted between the end faces of the gears and the circumference wall of the pump chamber, into a pressure chamber (55), the improvement comprising: one of the gears (2) is a driven gear, and the driven gear is driven by the drive shaft (4), wherein the drive shaft (4) is coupled to the driven gear (2) by means of a coupling (1) according to claim 4.

7. The coupling according to claim 1, wherein the coupling part includes two or more identically shaped disks.

8. A fuel-supply pump with two rotatable gears that engage each other and are disposed in a pump chamber (43), which supply fuel from an intake chamber (53) along a feed conduit (57) constituted between the end faces of the gears and the circumference wall of the pump chamber, into a pressure chamber (55), the improvement comprising: one of the gears (2) is a driven gear, and the driven gear is driven by the drive shaft (4), wherein the drive shaft (4) is coupled to the driven gear (2) by means of a coupling (1) according to claim 7.

9. A coupling for coupling rotatable bodies, the rotatable bodies being a gear (2) and a drive shaft (4) which are disposed essentially concentric to each other, the coupling having a coupling part (3) with surfaces which transmit torque between the coupling part and the rotatable bodies, wherein the coupling part (3) is integrated into one of the rotatable bodies (2, 4), wherein the surfaces which transmit torque between the coupling part (3) and the rotatable bodies (2, 4) are convex.

10. The coupling according to claim 9, wherein the coupling part (3) is a disk which has a central oblong hole (8) which receives the drive shaft (4), and which disk has four tapering projections (9, 10, 11, 12) embodied on it, wherein a central recess (14) is provided in the gear (2), whose contour is complementary to the contour of the disk.

11. The coupling according to claim 10, wherein the surfaces of the shaft that engage the hole are flat, and the side surfaces of the hole which engage with the surfaces of the shaft are slightly convex.

12. The coupling according to claim 9, wherein the coupling part includes two or more identically shaped disks.

13. A fuel-supply pump with two rotatable gears that engage each other and are disposed in a pump chamber (43), which supply fuel from an intake chamber (53) along a feed conduit (57) constituted between the end faces of the gears and the circumference wall of the pump chamber, into a pressure chamber (55), the improvement comprising: one of the gears (2) is a driven gear, and the driven gear is driven by the drive shaft (4), wherein the drive shaft (4) is coupled to the driven gear (2) by means of a coupling (1) according to claim 9.

14. A coupling for coupling rotatable bodies, the rotatable bodies being a gear (2) and a drive shaft (4) which are disposed essentially concentric to each other, having a coupling part (3), wherein the coupling part (3) is integrated into one of the rotatable bodies (2, 4), wherein the coupling part (3) is a disk which has a central oblong hole (8) to receive the drive shaft (4), and which has four tapering projections (9, 10, 11, 12) embodied on it, wherein a central recess (14) is provided in the gear (2), whose contour is complementary to the contour of the disk.

15. The coupling according to claim 14, wherein the surfaces of the shaft that engage the hole are flat, and the side surfaces of the hole which engage with the surfaces of the shaft are slightly convex.

16. The coupling according to claim 14, wherein the coupling part includes two or more identically shaped disks.

17. A fuel-supply pump with two rotatable gears that engage each other and are disposed in a pump chamber (43), which supply fuel from an intake chamber (53) along a feed conduit (57) constituted between the end faces of the gears and the circumference wall of the pump chamber, into a pressure chamber (55), the improvement comprising: one of the gears (2) is a driven gear, and the driven gear is driven by the drive shaft (4), wherein the drive shaft (4) is coupled to the driven gear (2) by means of a coupling (1) according to claim 14.

* * * * *